Patented Sept. 19, 1933

1,927,182

UNITED STATES PATENT OFFICE 1,927,182

TREATMENT OF HYDROCARBON OILS

Jacque C. Morrell, Chicago, Ill., assignor to Universal Oil Products Company, Chicago, Ill., a corporation of South Dakota No Drawing. Application October 6, 1930
Serial No. 486,874

3 Claims. (Cl. 196—35)

This invention relates to the treatment of hydrocarbon oils, and refers more particularly to a process of chemical treatment for improving the quality of hydrocarbon mixtures produced by the cracking reaction.

The invention contemplates the use under varying conditions of operation of substances typified by metallic compounds of the more highly oxidized acids of boron, such as, for example, the compounds of perboric acid $HBO_3$ or

Suitable salts which have been found useful are those of sodium, potassium and ammonium. The use of perborates of the heavy metals such as iron, copper and the like are also contemplated. These salts behave in aqueous solution generally like mixtures of borates with hydrogen peroxide, the active oxygen being liberated by heat, acidulation or dilution and there is thus furnished a means of effecting oxidations in alkaline media. The sodium compound may be made by adding a mixture of approximately 3 parts of boric acid and 1 part of sodium peroxide to 12 parts of cold water. A solution is formed first but later crystalization occurs and a precipitate separates out and may be filtered and dried. This substance which has a composition of $Na_2B_4O_8, 10H_2O$, is called "perborax" and is soluble in water to the extent of approximately 4%. When its solution is treated by a suitable amount of strong acid to displace half of the sodium a crystalline precipitate of sodium perborate separates

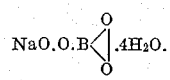

This is a very stable substance and can be preserved indefinitely at ordinary temperatures. It can be dissolved to an extent of approximately 2½% in water, from which solution it yields active oxygen when heated, the cold solution possessing generally the properties of hydrogen peroxide solutions.

I have found that sodium and similar perborates can be used effectively either in solution or in suspension as solids in the treatment by various means of the light products of cracking reactions, the general effect of the use of these substances being toward desulfurization and the production of sulfur compounds non-reactive with solutions of sodium plumbite such as are employed in the commonly-known "doctor" solutions. By proportioning the amount of perborate solution used the tendency of the oxidizing reaction to induce polymerization with attendant gum formation can be controlled so as to either reduce the formation to a minimum when re-running of stocks is not anticipated or gum formation can be reduced by the addition of measuring quantities, the subsequent redistillation leaving the polymers in the residual oil. Where it is merely desired to "sweeten" the light products small amounts, for example, 2 to 5% by volume, of the aqueous solution of the alkaline perborate may be used in the cold in any suitable mixing apparatus.

When used for sweetening purposes the perborate solutions may be used either alone or in combination with a plumbite or such reagents as copper acetate. Following the treatment with the metallic solutions typified by such lead or copper solutions the spent reagents are withdrawn and the oil then treated with perborate, the sweetening reaction being essentially the oxidation of the metallic mercaptides. In this case the action is generally one of oxidation of mercaptans to the corresponding di-sulphides which are non-reactive to the doctor solution previously mentioned. Where further desulfurization is desired amounts of finely divided solid alkaline perborates up to 2% by weight of the oil may be added and treatment conducted at elevated temperatures either previous to or concurrent with distillation. When the solid perborates are used, it is usually done with a view to producing gums by polymerization which are left behind in the redistillation or other subsequent treatment.

In cases of distillation of the oil with the perborate or in contact with the same employing steam as a carrying agent, an alkaline solution of borax results which has no deleterious effect on the equipment and may be removed from the system and which is actually beneficial itself in treating. A convenient method for the treatment of cracked gasolines consists in the use of perborate solutions which are caused to run counter-flow to the vapors rising in a fractionating column in which the gasoline fractions are undergoing final separation. When using the perborate, the solid substance, a solution or a suspension may be used in cold treatments or at elevated temperatures such as occur during reflux and distilling operations. The quantities used will vary depending on the kind of oil to be treated and the conditons of treatment. The perborate treatment may be used alone or in conjunction with other refining treatments such as sulphuric acid treatment, treatment with alkaline solutions, solutions of various salts, adsorbent earths, the order of treatment varying with the results desired and the nature of the oil undergoing treatment.

As a specific example of the operation of the present invention, a gasoline produced by the cracking of a heavy California gas oil was treated cold or at approximately atmospheric temperature with 3% by volume of a saturated aqueous solution of sodium perborate. This distillate had been previously washed with sufficient amounts of 10° Bé. caustic soda to insure substantially complete removal of dissolved hydrogen sulfide. After the caustic soda treatment the distillate still gave a pronounced reaction with doctor solution and contained 0.5 sulfur. After the treatment of the solution with sodium perborate which was effected by injecting the solution into the suction line of a centrifugal pump employed to transfer the distillate from one storage tank to another the distillate reacted negative to the doctor test and analysis showed that the sulfur content had been reduced from 0.5 to 0.35.

In another instance a distillate also produced from California heavy gas oil by cracking was treated with caustic soda as before and subsequently with 66° Bé. sulfuric acid at the rate of eight pounds per barrel with suitable periods of settling for sludge removal and washing. This distillate then had a sulfur content of 0.15% and laboratory distillation analysis indicated that it contained 80% of hydrocarbons boiling up to 425° F., the sulfur content of the overhead products being 0.10%, the reaction with doctor solution definitely positive and the gum content by copper dish method 50 mg./100 cc. When this distillate was distilled with 1.5% by weight of sodium perborate the gasoline recovered contained less than 0.1% sulfur and was negative to the doctor test. In addition, it was found that the gum content was only 20 mg. as compared to 50 in a similar distillate that had not been subjected to the perborate treatment.

While specific examples have been given to show the operation of the process of the present invention it is to be understood that they are illustrative merely. In the case of distillates from the cracking of stocks from other producing areas different amounts of solutions of different perborates may be advantageously employed.

By the use of the term "perborate" as used herein and in the claims I mean to include perboric acid, the salts of perboric acid including the various metallic salts of perboric acid and the ammonium salts.

I claim as my invention:

1. A method for refining hydrocarbon distillate which comprises flowing the same in vaporous form countercurrent to an aqueous perborate solution.

2. A method for refining vapors containing cracked gasoline which comprises fractionating the vapors while flowing the same countercurrent to an aqueous perborate solution.

3. A process for refining hydrocarbon distillates containing mercaptans which comprises subjecting such distillate to the action of a reagent capable of converting the mercaptans to metallic mercaptides, and treating the distillate with a perborate to transform the mercaptides to di-sulphides.

JACQUE C. MORRELL.